(12) United States Patent
Wen

(10) Patent No.: US 7,738,199 B1
(45) Date of Patent: Jun. 15, 2010

(54) FILTER DEVICE

(75) Inventor: Pei-Chen Wen, Taipei Hsien (TW)

(73) Assignee: Taiwan Straight Forward 100 Co., Ltd., Taipei Hsien (TW)

( * ) Notice: Subject to any disclaimer, the term of this patent is extended or adjusted under 35 U.S.C. 154(b) by 0 days.

(21) Appl. No.: 12/380,258

(22) Filed: Feb. 25, 2009

(51) Int. Cl.
G02B 7/00 (2006.01)

(52) U.S. Cl. .................................. 359/892; 359/722

(58) Field of Classification Search ............ 359/722, 359/723, 892
See application file for complete search history.

(56) References Cited

U.S. PATENT DOCUMENTS 7,158,323 B2 * 1/2007 Kim et al. .................. 359/892

2007/0133967 A1 * 6/2007 Takahashi et al. ............. 396/55

* cited by examiner

Primary Examiner—Darryl J Collins
(74) Attorney, Agent, or Firm—William E. Pelton, Esq.; Cooper & Dunham LLP

(57) ABSTRACT

A filter device has a frame, an optical filter, two magnetic members and two covers. The frame has a window and two rails attached to the opposite sides of the window. Each rail has two coil holding portions. The optical filter is able to slide between the rails and has at least one lens and two holders holding the magnetic members. The covers hold the optical filter between the rails. Thus the filter device is able to prevent the coils from wear-out failures with a simple and enduring structure.

20 Claims, 7 Drawing Sheets

FILTER DEVICE

BACKGROUND OF THE INVENTION

1. Field of the Invention

The present invention relates to a filter device, especially to a filter device with an optical filter.

2. Description of the Prior Art

A camera, especially a monitoring camera, comprises a camera lens, a photographic sensing device and a conventional filter device. The photographic sensing device provides an optical sensing element such as a negative or a charge-coupled device ("CCD"). The filter device is mounted between the camera lens and the sensing element of the photographic sensing device. The filter device is used to filter and adjust a light coming into the camera through the camera lens aiming for the sensing element of the photographic sensing device. The conventional filter device may have for example a transparent lens and a colored lens. The lenses selectively switch in daylight or at night so that the light passing through the lens exposes the sensing element of the photographic sensing device in a proper intensity.

The conventional filter device having multiple lenses is driven by a driving device to align a desired lens with the camera lens and the sensing element. An embodiment of the conventional driving device is a driving motor allowing lenses of the filter device to slide to a position for alignment. However, the size of the driving motor makes it infeasible to minimize the filter device.

Taiwan utility patents No. M253792 and M302047 provide minimized filter devices. The minimized filter device has a coil wound around the lenses and magnetic elements corresponding to the coil. The coil carrying electric currents generates magnetic flux and applies magnetic force on the magnetic elements to drive the lenses to slide. Thus desired lens is slide to a position allowing alignment with the camera lens and the sensing element. Such simple structure makes minimized filter devices possible.

However, abrasion occurs while the coil slide against other element within the minimized filter device. The coil may be worn-out and cause failure. Although the minimized filter device provided by the patent No. M302047 has an additional positioning track preventing the coil to break by yanking from an outer wire, the positioning track fail to prevent the coil from wearing-out. The worn-out failure problem of the minimized filter device is apparent.

In an ecological aspect, both the aforementioned conventional filter device and the minimized filter device require constant electric power supply during whole operating process. The driving motor and the coil consume power continuously even when they are not driving the lenses to slide. It is obvious that the current market goes for minimized and power-saving products. Solving the power-wasting problem is expected to bring commercial competitiveness and global good in the ecological aspect.

To overcome the shortcomings, the present invention provides a filter device to mitigate or obviate the aforementioned problems.

SUMMARY OF THE INVENTION

The main objective of the invention is to provide a filter device that prevents coils from wear-out failure.

The filter device in accordance with the present invention has a frame, an optical filter, two magnetic members and two covers. The frame has a window and two rails attached to the opposite sides of the window. Each rail has two coil holding portions. The optical filter is able to slide between the rails and has at least one lens and two holders holding the magnetic members. The covers hold the optical filter between the rails.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
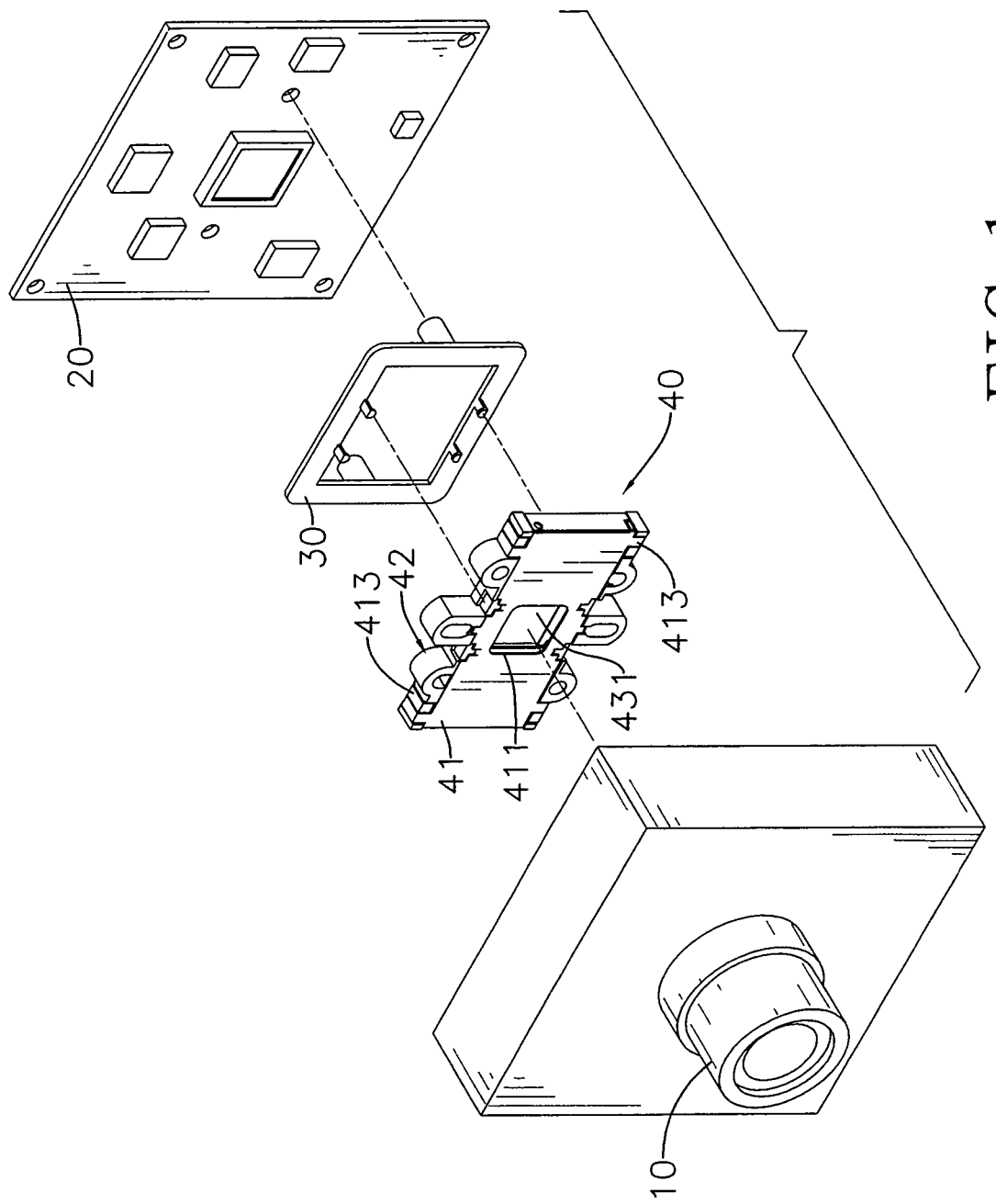
FIG. 1 is an exploded perspective view of a camera using a filter device that is in accordance with the present invention.
Figure 2:
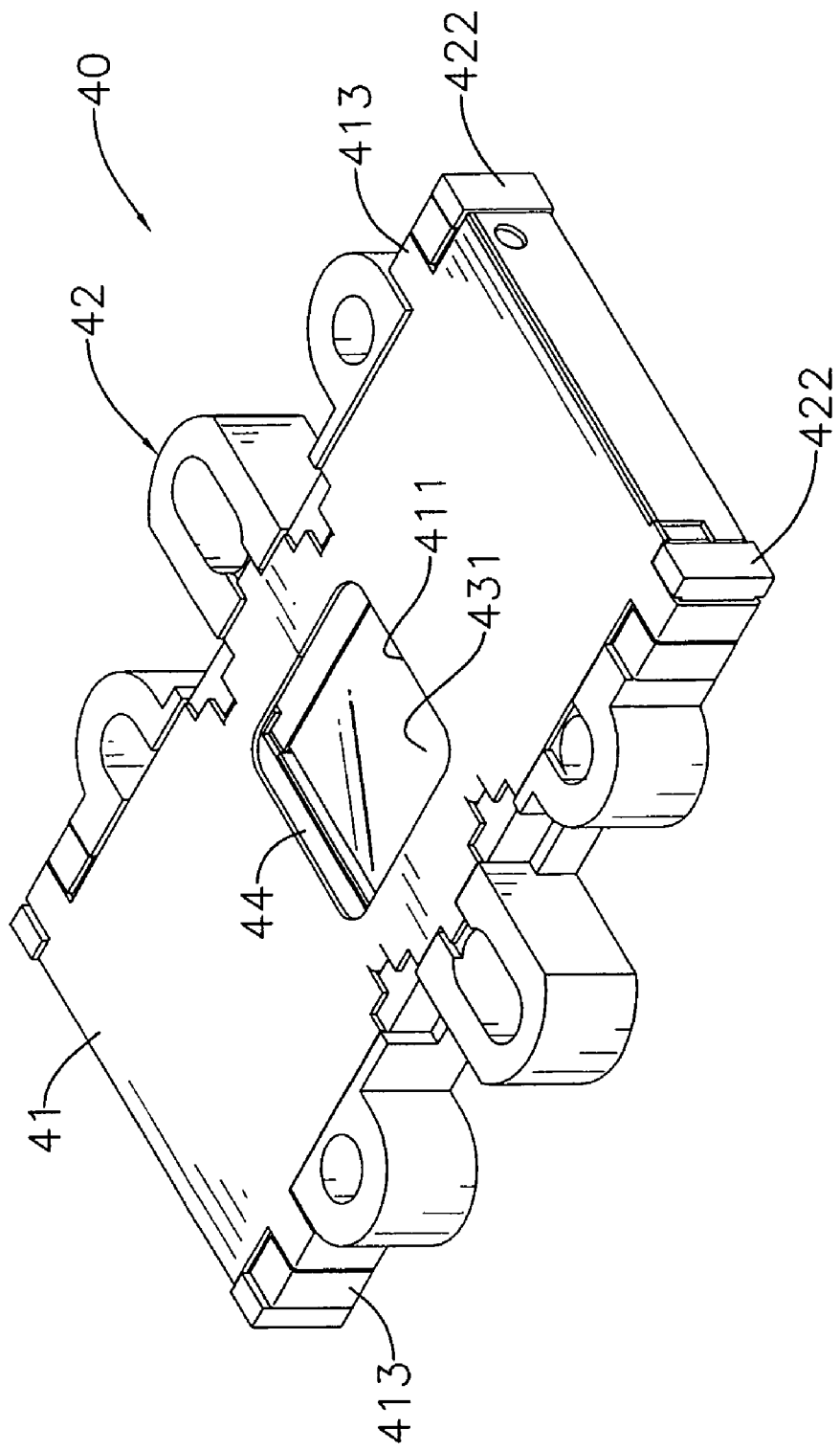
FIG. 2 is a perspective view of the filter device in FIG. 1.

With reference to FIGS. 1 and 2, a filter device (40) in accordance with the present invention is used in a camera and mounted with a stand (30) between a camera lens (10) and a photographic sensing device (20) providing an optical sensing element such as a negative or a CCD. A light coming into the camera through the camera lens (10) is filtered by the filter device (40) before reaching the optical sensing element of the photographic sensing device (20). The filtered light reaches and is sensed by the optical sensing element in a proper intensity. Therefore the photographic sensing device will have better chances to generate recognizable images.

Figure 3:
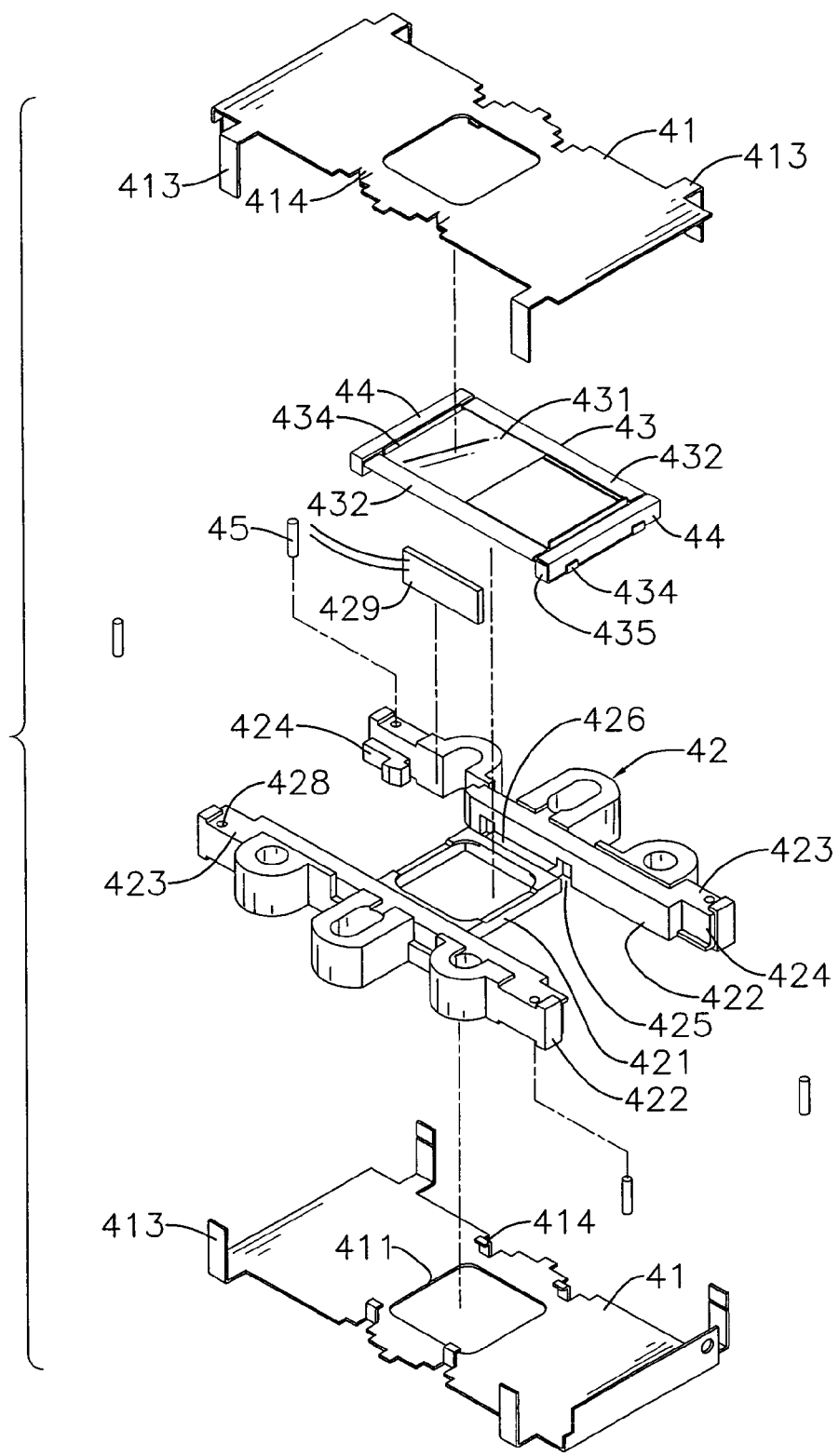
FIG. 3 is an exploded perspective view of the filter device in FIG. 1.

With reference to FIG. 3, the filter device (40) comprises a frame (42), two coils (427), an optical filter (43), two magnetic members (44), two covers (41), two optional magnetic pieces (45) and an optional switch (429).

Figure 5:
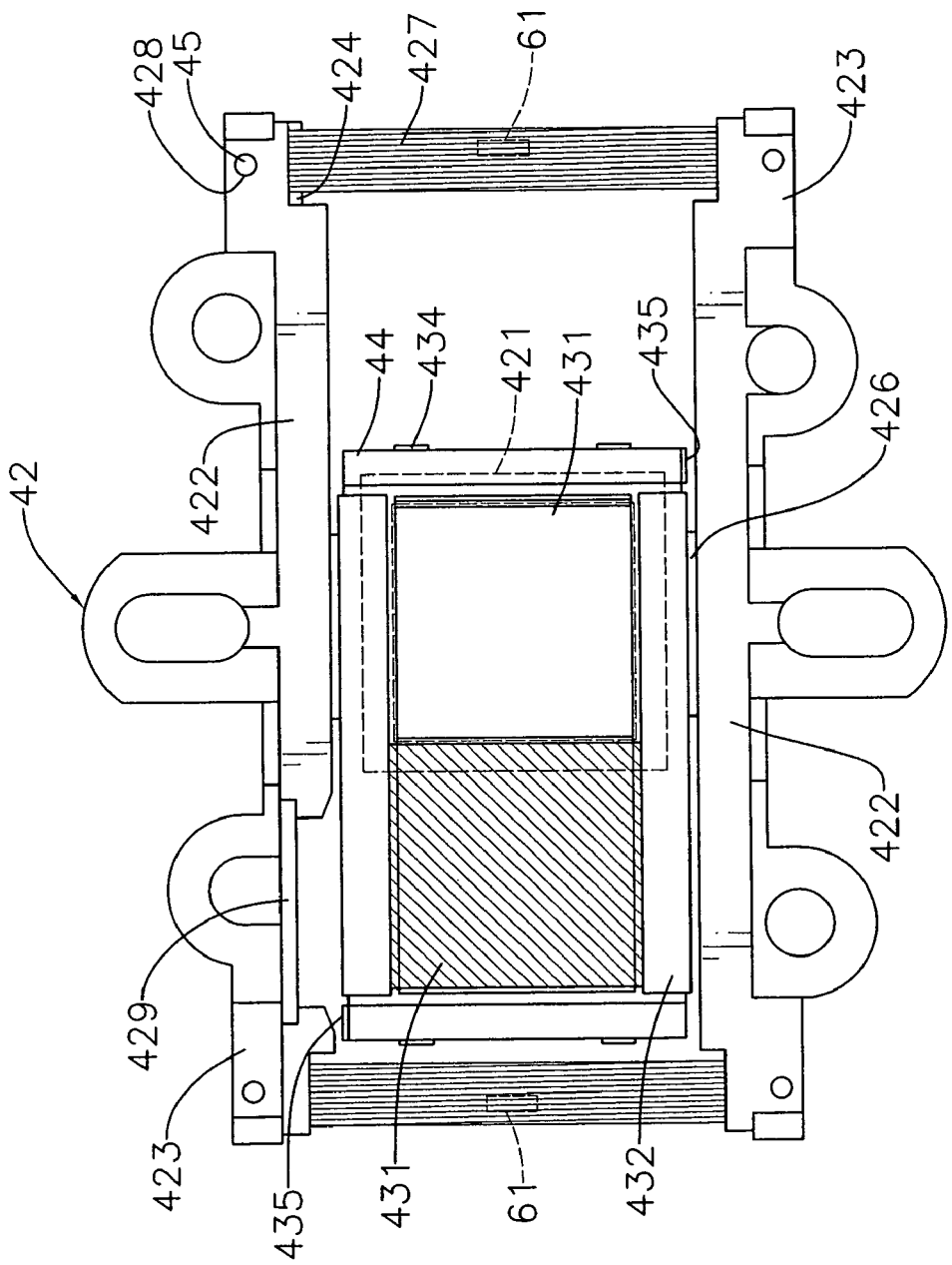
FIG. 5 is an operational front view of a filter device in accordance with the present invention without covers, wherein the optical filter of the filter device has two lenses.
Figure 6:
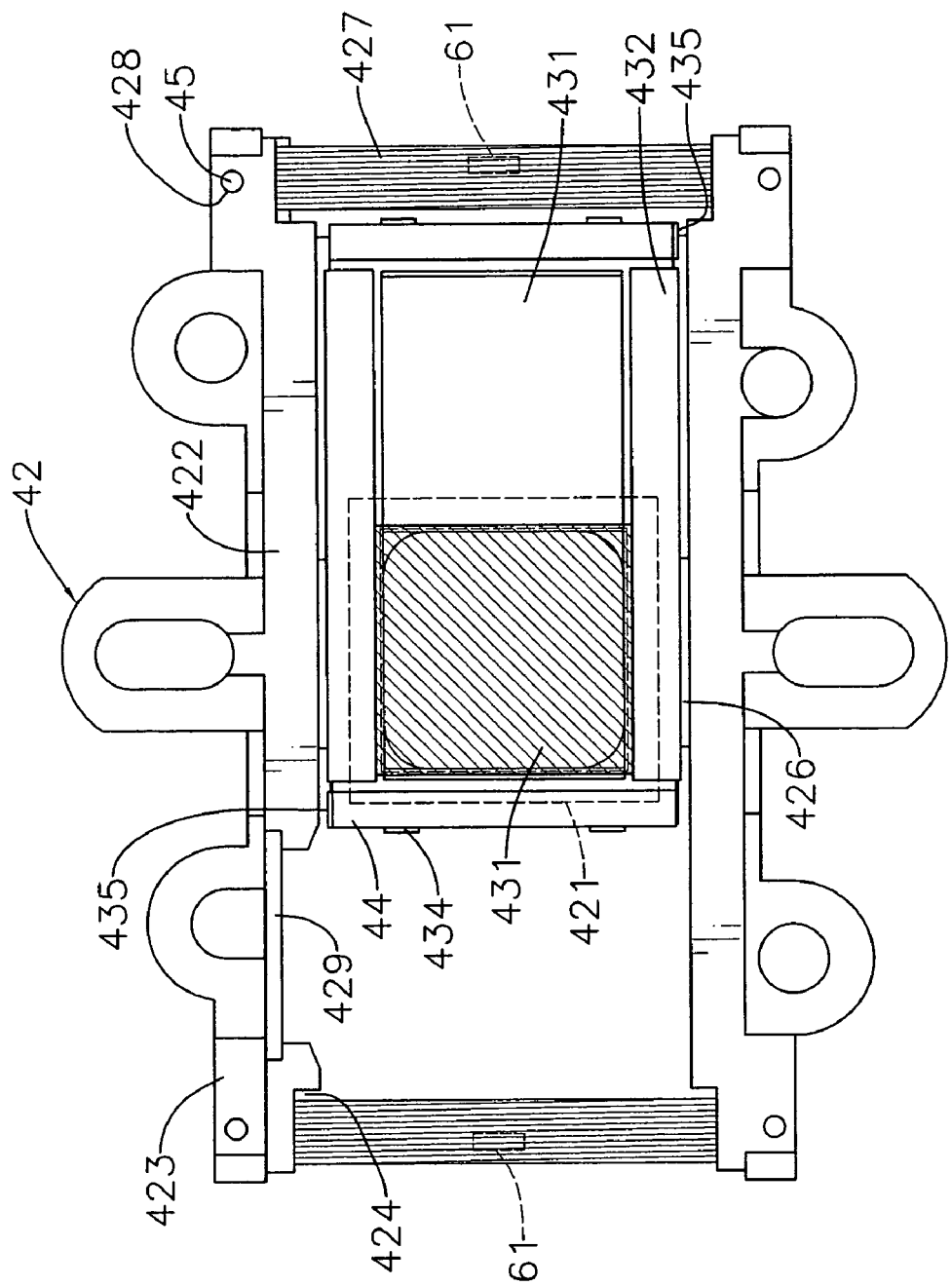
FIG. 6 is another operational front view of the filter device in FIG. 5 without covers.

The frame (42) comprises a window (421), two rails (422) and two sets of notches (425). The windows (421) comprises two opposite sides. The rails (422) are respectively attached to the sides of the window (421). A light coming into the camera through the camera lens (10) passes through the window (421). Each rail (422) comprises multiple fastening portions (423), two coil-holding portions (424) and an attaching portion (426). The coil-holding portions (424) of one rail (422) correspond respectively to the coil-holding portions (424) of the other rail (422). As shown in FIGS. 5 and 6, the coils (427) are mounted between the rails (422). Each coil (427) is mounted between one coil-holding portion (424) of one rail (422) and one coil-holding portion (424) of the other rail (422). The attaching portion (426) is located between the two coil-holding portions (424) and is attached to one of the two opposite sides of the window (421). The each set of notches (425) is formed between the window (421) and one rail (422).

When carrying current, the coil (427) generates a magnetic flux. In order to adjust the magnetic flux, a core (61) is mounted in the coil (427). The core (61) has a size that allowing mounting in the coil (427) and may be made of a magnetic material such as ferrite or cobalt. An embodiment of the core (61) is a 2 to 3 square centimeter ferric plate having a thickness of 1 millimeter.

With further reference to FIG. 3, the optical filter (43) comprises two sliders (432), at least one lens (431) and two holders (434). Each slider (432) comprises a first end and a second end. The lens (431) is mounted between the two sliders (432). One of the two holders (434) is attached to the first ends of the two sliders (432). The other holder (434) is attached to the second ends of the two sliders (432). In an embodiment of the present invention, the optical filter (43) has only one lens (431). The optical filter (43) of such embodiment may have a lens (431) and a hollow portion without being occupied by a lens. The hollow portion allows light to pass through unfiltered, while the lens (431) provides a light-filtering function.

With further reference to FIGS. 5 and 6, in a preferred embodiment of the optical filter (43), two lenses (431) are mounted between and along the longitudinal direction of the two sliders (432). In the embodiment of the optical filter (43) comprising two lenses (431), one of the two lenses (431) is transparent and clear while the other lens (431) is colored. By sliding the optical filter (43) to different positions, the clear lens (431) or colored lens (431) can be aligned with the window (421) in order to provide different filtering effects.

The two sliders (432) and the two holders (434) of the optical filter (43) may define a rectangular framework around the at least one lens (431).

Each holder (434) may be bent to hold one magnetic member (44).

The holder (434) may further have a magnetic part (435) and two ends. The magnetic part (435) is made of a magnetic material such as ferrite or cobalt and is located substantially at one end of the holder (434). The magnetic part (435) is also magnetically attracted by the magnetic flux created by the coils (427) when electrical current are applied. Thus, in operation, there is a stronger magnetic attraction between the coil (427) and the optical filter (43) when compared to the magnetic attraction between the coil (427) and the magnetic member (44).

The magnetic members (44) are respectively held by the two holders (434). An embodiment of each magnetic member (44) is a magnetic bar made of a natural magnet or an artificial magnet.

In an embodiment of the present invention, each magnetic member (44) has two ends and each end is flush with one slider (432). Each magnetic part (435), being a thin plate, is located at one end of the magnetic member (44) to enhance the magnetic attraction between the coil (427) and the optical filter (43).

Figure 4A:
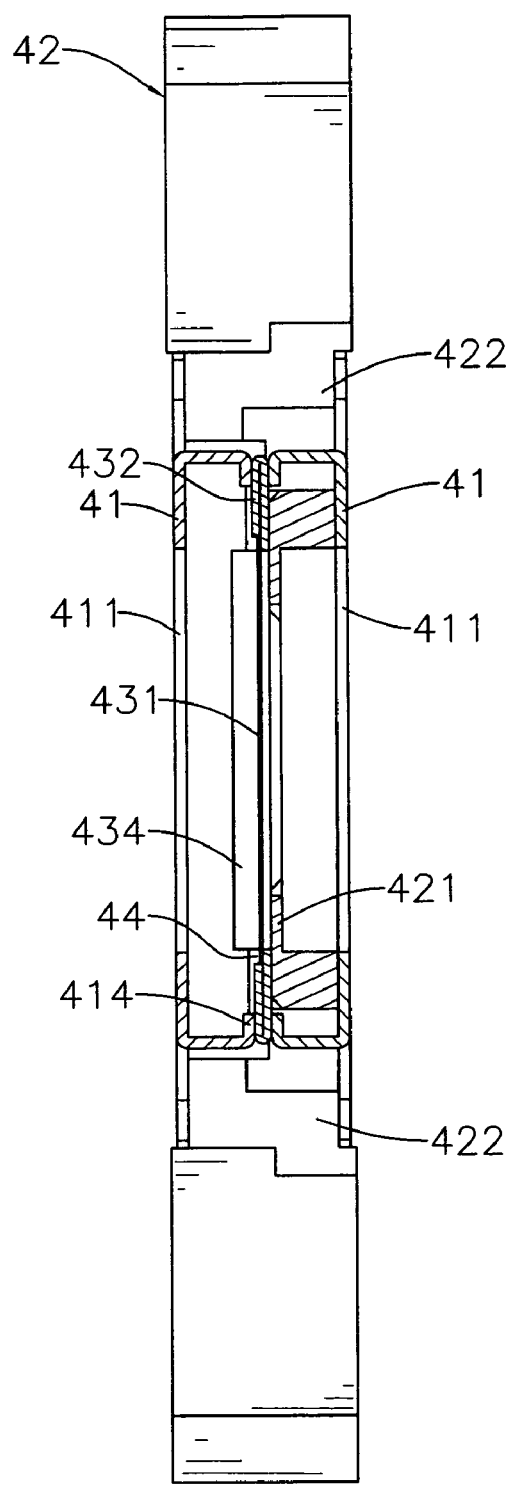
FIG. 4A is a cross sectional side view of the filter device in FIG. 1.
Figure 4B:
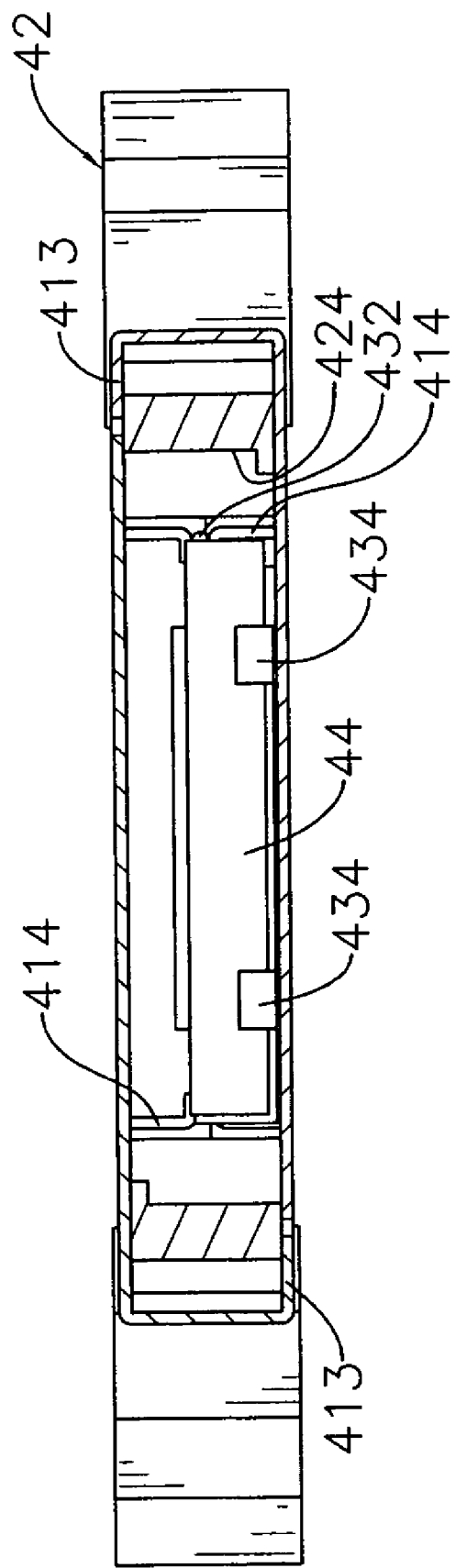
FIG. 4B is another cross sectional side view of the filter device in FIG. 1.

With further reference to FIGS. 4A and 4B, the two covers (41) hold the optical filter (43) between the rails (422). Each cover (41) is a plate and comprises an opening (411), multiple fasteners (413) and two sets of projections (414). The opening (411) is aligned to the window (421). The multiple fasteners (413) may be hooks, are formed on the cover (41) and are mounted respectively on the fastening portions (423) of the frame (42). The projections (414) are formed on the cover (41) and each set of the projections (414) limits one slider (432). In an embodiment of the covers (41), the cover (41) is firstly formed as a flat plate with the fasteners (413) and projections (414) extending outwards. The projections (414) are then bent toward the frame (42). The fasteners (413) are bent to catch the fastening portions (423) and fasten the covers (41) to the frame (42). The optical filter (43) is held between the rails (422) by the covers (41) fastened to the frame (42). The projections (414) are located inside the covers (41) between the rails (422) to limit the movement of the sliders (432) of the optical filter (43). In the embodiment of the frame (42) that comprises multiple notches (425) formed between the window (421) and the rail (422), the projections (414) are received respectively in the notches (425) for positioning.

With further reference to FIGS. 5 and 6, the magnetic pieces (45) are attached respectively beside two of the coil-holding portions (424) and may be made of a magnetic material such as ferrite or cobalt. In an embodiment of the present invention, each rail (422) further has holes (428) formed respectively in the fastening portions (423) and respectively beside the coil-holding portions (424). Each magnetic piece (45) is a ferric bar inserted in one of the holes (428). In this embodiment, the holes (428) are defined respectively through the fastening portions (423). The frame (42), the optical filter (43), the magnetic members (44), the covers (41) and the magnetic pieces (45) are assembled to be the filter device (40). With the aforementioned structure, the holes (428) are sealed by the cover (41) that also secure the magnetic pieces (45) inside the holes (428). In this embodiment, each rail (422) has two holes (428) respectively located beside the two coil-holding portions (424). That is, the two rails (422) constituting the frame (42) collectively give four holes (428) respectively located at the four corners of the frame (42). It is preferred that the two magnetic pieces (45) are respectively inserted in two holes (428) of diagonally opposing corners. The filter device (40) in accordance with the present invention may further have two more magnetic pieces (45), so that the four magnetic pieces (45) are respectively inserted in the four holes (428).

The switch (429) is attached to one of the two rails (422). In a preferred embodiment of the present invention, the switch (429) is attached to one of the rails (422) and faces the other rail (422). The switch (429) connects the coils (427) to a power source and selectively supplies electrical power towards the coils (427).

Before using the filter device (40) of the present invention, coils (427) are attached to the corresponding coil-holding portions (424) of the two rails (422). When the coils (247) are electrified a magnetic field will be generated. The magnetic field applies a magnetic force on the magnetic members (44) towards different directions when the coils (247) are electrified with currents of different directions. Therefore the optical filter (43) will slide under the magnetic force. Thus different lenses (431) are aligned between the camera lens (10) and the optical sensing element of the photographic sensing device (20), wherein different lenses (431) provides different filtering effect.

During the sliding process of the optical filter (43), the coils (247) are mounted securely on the coil-holding portions (424). Furthermore, no moving parts slide against any of the coils (247), preventing the coils (247) from being worn-out abrasively.

The covers (41) protect the optical filter (43) and also limit the movement of the optical filter (43) with the projections (414). The projections (414) are located beside the sliders (432) of the optical filter (43) and keep the sliders (432) to slide within the projections (414). Since the sliders (432) are able to slide within the limiting projections (414) as desired in the aforementioned structure, additional slider-limiting tracks commonly seen in the structure of a conventional filter device are not necessary in the present invention. Besides, the optical filter (43) that generating the magnetic force and the coils (427) on which the magnetic force is applied together constitute an easy-made and low-cost structure that is simple, enduring and commercially competitive.

The present invention provides a small-sized filter device (40) having a structure that prevents coils (427) from wear-out failures. The filter device (40) in accordance with the present invention obviates the problems of conventional filter devices.

With further reference to FIG. 1, in embodiments employing the magnetic pieces (45), when the optical filter (43) slides to a position allowing the desired lens (431) aligned between the camera lens (10) and the optical sensing element of the photographic sensing device (20), the electrical power supply towards the coils (427) may be cut off for saving power. When the electrical power supply towards the coils (427) is cut off, the coils (427) will no longer attract the magnetic members (44). At the same time, the magnetic pieces (45) magnetically attract the magnetic members (44) to retain the optical filter (43) in the desired position.

When it is necessary to move the optical filter (43) again to align other lens (431) between the camera lens (10) and the optical sensing element of the photographic sensing device (20), the coils (427) will be again supplied with electrical power to create a magnetic flux. The magnetic flux of the coils (427) applies a magnetic force against the magnetic attraction between the magnetic piece (45) and the magnetic member (44) to drive the optical filter (43). When the optical filter (43) driven by the magnetic force slides to another position allowing the other lens (431) aligned between the camera lens (10) and the optical sensing element of the photographic sensing device (20), the electrical power supply towards the coils (427) may be cut off again for saving power. With the aforementioned operation, only when switching different lens (431) will electric power supply towards the coils (427) necessary. During most of the process of using the filter device (40), the filter device (40) is in an ecological state that consumes no power. As a result, the present invention indeed provides a means to save power ecologically with simple structure.

In order to further improve the convenience of using the present invention, the switch (429) may have an operationally controllable circuit that determines the ON-OFF state of the electrical power supply towards the coils (427).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A filter device comprising
a frame comprising
a window comprising two opposite sides and
two rails being respectively attached to the sides of the window and each rail comprising
multiple fastening portions;
two coil-holding portions;
an attaching portion being located between the two coil-holding portions and attached to one of the two opposite sides of the window;
two coils being mounted between the rails and each coil being mounted between one coil-holding portion of one rail and one coil-holding portion of the other rail;
an optical filter comprising
two sliders, each slider comprising a first end and a second end;
at least one lens mounted between the two sliders;
two holders, one holder being attached to the first ends of the two sliders and the other being attached to the second ends of the two sliders and each holder having two ends;
two magnetic members respectively held by the two holders;
two covers holding the optical filter between the rails, each cover being a plate and comprising
an opening aligned to the window;
multiple fasteners formed on the cover and mounted respectively on the fastening portions of the frame;
two sets of projections formed on the cover and each set limiting one of the sliders.

2. The filter device as claimed in claim 1, wherein
the frame has four corners; and
the filter device further comprises two magnetic pieces attached respectively to diagonally opposing two of the corners.

3. The filter device as claimed in claim 2, wherein
the optical filter has two lenses mounted between and along the longitudinal direction of the sliders; and
the two sliders and the two holders of the optical filter define a rectangular framework around the two lenses.

4. The filter device as claimed in claim 3, wherein the fastening portions are defined respectively beside the coil-holding portions;
each fastening portion further has a hole and two of the holes respectively receive the magnetic piece.

5. The filter device as claimed in claim 3, wherein each holder further comprises a magnetic part located substantially at one end of the holder.

6. The filter device as claimed in claim 5, wherein the fastening portions are defined respectively beside the coil-holding portions;
each fastening portion further has a hole and two of the holes respectively receive the magnetic piece.

7. The filter device as claimed in claim 2, wherein each holder further comprises a magnetic part located substantially at one end of the holder.

8. The filter device as claimed in claim 7, wherein the fastening portions are defined respectively beside the coil-holding portions;
each fastening portion further has a hole and two of the holes respectively receive the magnetic piece.

9. The filter device as claimed in claim 2, wherein the fastening portions are defined respectively beside the coil-holding portions;
each fastening portion further has a hole and two of the holes respectively receive the magnetic piece.

10. The filter device as claimed in claim 2 further comprising two sets of notches and each set of the notches formed between the window and one rail.

11. The filter device as claimed in claim 1, wherein
the optical filter has two lenses mounted between and along the longitudinal direction of the sliders; and
the two sliders and the two holders of the optical filter define a rectangular framework around the two lenses.

12. The filter device as claimed in claim 11, wherein each holder further comprises a magnetic part located substantially at one end of the holder.

13. The filter device as claimed in claim 12, wherein the fastening portions are defined respectively beside the coil-holding portions;
each fastening portion further has a hole and two of the holes respectively receive the magnetic piece.

14. The filter device as claimed in claim 11, wherein the fastening portions are defined respectively beside the coil-holding portions;

each fastening portion further has a hole and two of the holes respectively receive the magnetic piece.

15. The filter device as claimed in claim 11 further comprising two sets of notches and each set of the notches formed between the window and one rail.

16. The filter device as claimed in claim 1, wherein each holder further comprises a magnetic part located substantially at one end of the holder.

17. The filter device as claimed in claim 16, wherein the fastening portions are defined respectively beside the coil-holding portions;

each fastening portion further has a hole and two of the holes respectively receive the magnetic piece.

18. The filter device as claimed in claim 1, wherein the fastening portions are defined respectively beside the coil-holding portions;

each fastening, portion further has a hole and two of the holes respectively receive the magnetic pieces.

19. The filter device as claimed in claim 1, wherein the fastener of the cover is a hook hooking on the fastening portion.

20. The filter device as claimed in claim 1 further comprising a switch attached to one of the two rails.

* * * * *